July 14, 1936.　　　　　G. BELCH　　　　2,047,850
GATE
Filed Sept. 16, 1935　　　2 Sheets-Sheet 1
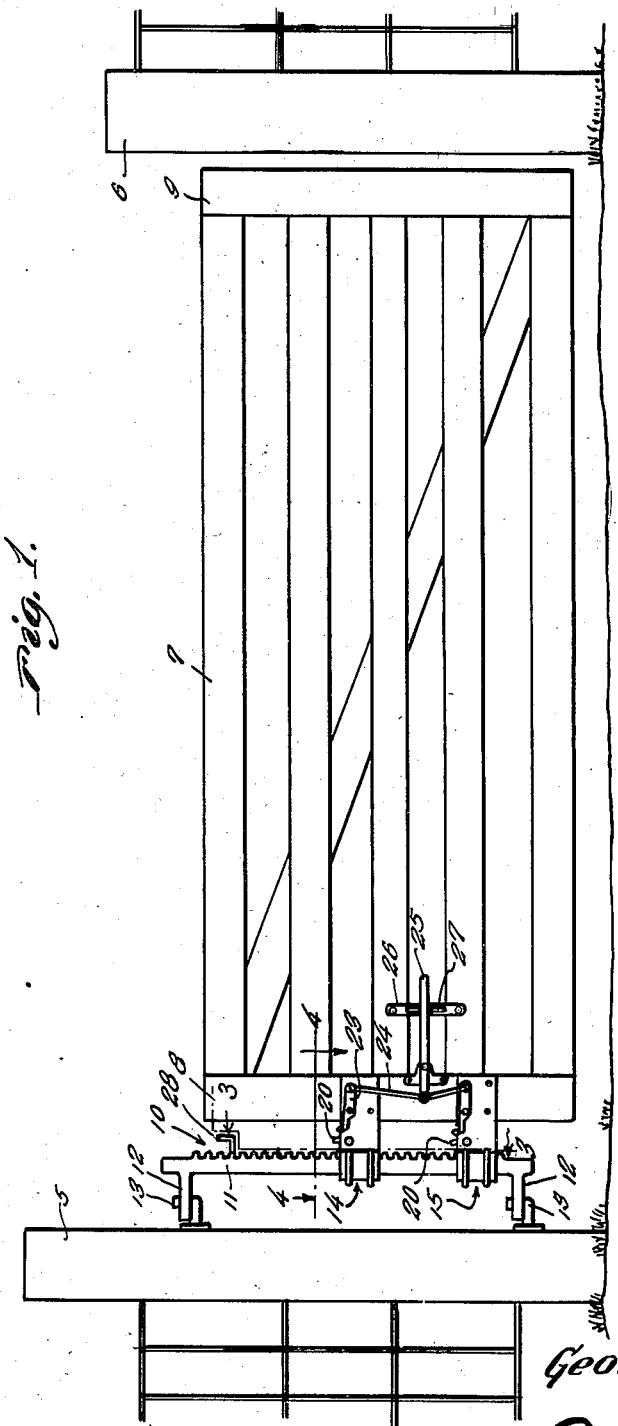
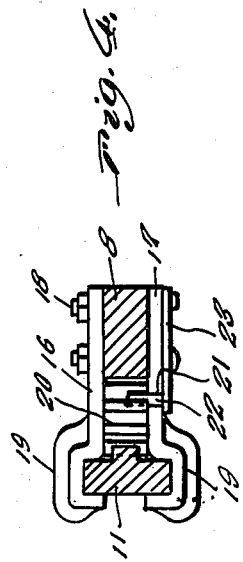
Inventor
George Belch
By Clarence A O'Brien
Attorney July 14, 1936.  G. BELCH  2,047,850
GATE
Filed Sept. 16, 1935   2 Sheets-Sheet 2
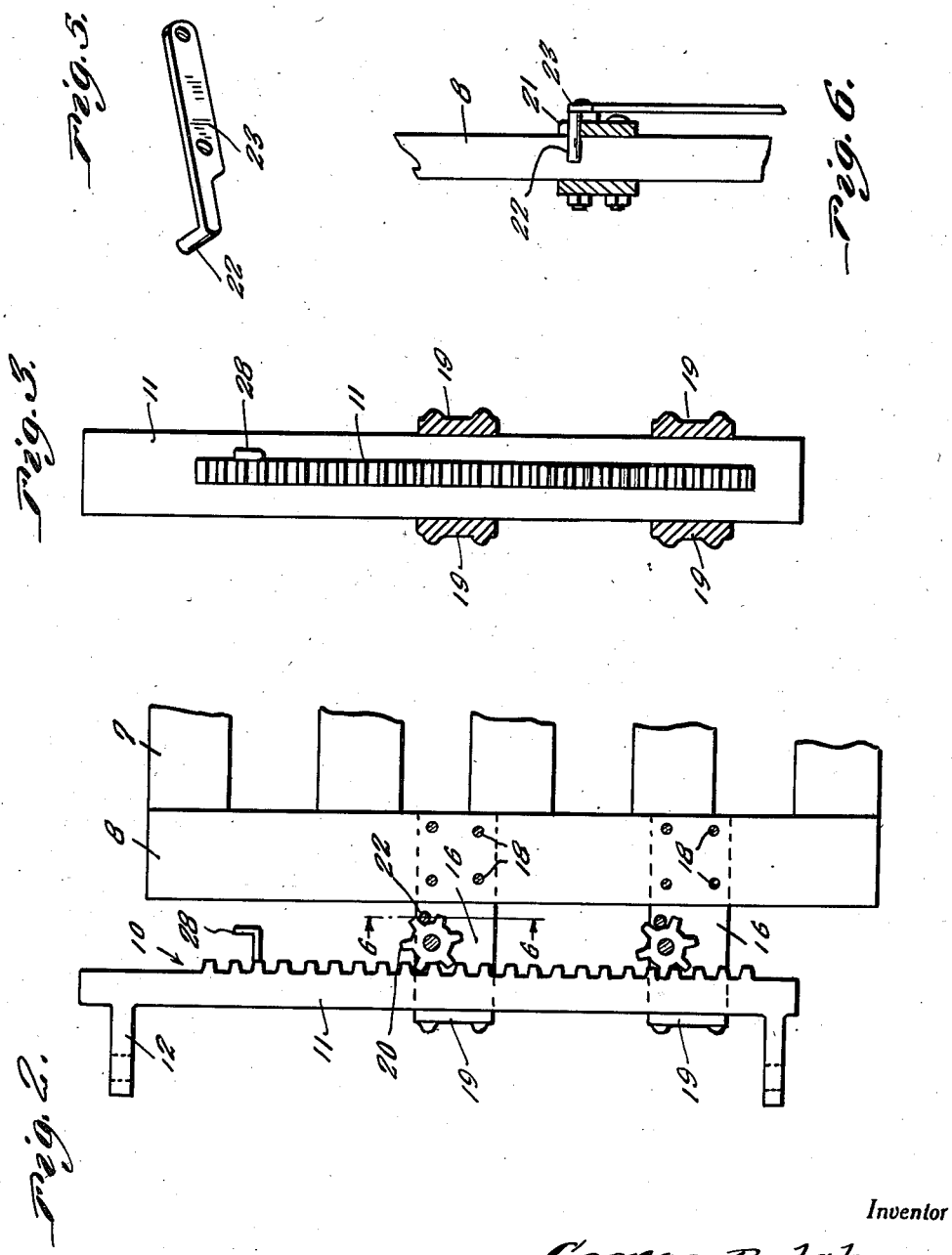
Inventor
George Belch
By Clarence A. O'Brien
Attorney Patented July 14, 1936

2,047,850

UNITED STATES PATENT OFFICE 2,047,850

GATE

George Belch, Pierceton, Ind.

Application September 16, 1935, Serial No. 40,861

1 Claim. (Cl. 39—14)

This invention appertains to new and useful improvements in gate hinges and more particularly to hinges for farm gates.

The principal object of the present invention is to provide a farm gate hinge which can be adjusted in such a manner as to permit elevation or lowering of the gate proper so as to regulate the clearance under the gate for various sizes of poultry or stock.

Another important object of the invention is to provide a hinge of the character stated which can be adjusted easily.

Other important objects and advantages of the invention will become apparent to the reader of the following specification.

In the drawings:

Figure 1 represents a side elevational view of the gate and hinge.

Figure 2 represents a vertical sectional view through the hinge structure.

Figure 3 represents a vertical sectional view taken substantially on line 3—3 of Figure 1.

Figure 4 represents a cross sectional view taken substantially on line 4—4 of Figure 1.

Figure 5 is a perspective view of one of the latch members.

Figure 6 is a fragmentary detailed sectional view taken substantially on line 6—6 of Figure 2.

Referring to the drawings wherein like numerals designate like parts, it can be seen in Figure 1 that numerals 5—6 represent the gate posts while numeral 7 is the gate provided with the end pieces 8—9.

Numeral 10 generally refers to the novel hinge structure.

This hinge structure consists of the vertically extending rack bar 11 which is provided with laterally extending lugs 12—12 apertured to receive the upstanding portions of the hangers 13—13 located on the post 5.

The end piece 8 of the gate has a pair of assemblies 14—15 applied thereto and each of these assemblies consists of a pair of plates 16—17 secured to the end piece 8 by bolts 18 so as to extend in the directions of post 5, at which end these plates are provided with guide heads 19 which engage around the rack bar 11 to serve as a guide.

Between each pair of these plates 16—17 is mounted a pinion gear 20 for mesh with the rack bar 11 and as is shown in Figures 4 and 6, each of the plates 17 is notched as at 21 to receive the lateral pintle 22 on the free end of the corresponding rockable latch member 23. The remaining ends of these latch members 23 are connected by a link member 24 to the rockable lever 25, the handle portion of which is cooperative with the bridge piece 26 spanning certain rails of the fence 7 and this bridge piece 26 is provided with suitable catches or teeth 27 thereon for holding the lever 25 in an adjusted position.

It can now be seen, that by actuating the lever 25 the latches 23 will be disengaged from the teeth of the pinion 20 and the gauge may be raised or lowered to the extent desired. The gate will be prevented from rising too far by means of a stop 28 located on the rack bar 11 adjacent the upper end thereof.

While the foregoing specification sets forth the invention in specific terms, it is to be understood that numerous changes in the shape, size and materials may be resorted to without departing from the spirit or scope of the invention as claimed hereinafter.

Having described the invention, what is claimed as new is:

In a gate structure, a fence post, a gate section, hanger members on the gate post, a vertically extending rack bar horizontally swingable on the hangers, a guide extending from one end of the gate section and slidably disposed on the rack, a gear mounted in the guide and meshing with the teeth of the rack, said guide having a notch in the side thereof, a rocker mounted on the guide and having a lateral pintle engageable into the notch for disposition in the path of one of the teeth of the gear, means for actuating the said rocker and means for retaining said means in adjusted positions.

GEORGE BELCH.